United States Patent Office 3,752,878
Patented Aug. 14, 1973

3,752,878
HYDROLYSIS OF ARYL HALIDES WITH A RARE EARTH METAL PHOSPHATE
William L. Kehl and Raymond J. Rennard, Jr., Pittsburgh, Pa., assignors to Gulf Research & Development Company, Pittsburgh, Pa.
No Drawing. Filed Dec. 30, 1970, Ser. No. 103,003
Int. Cl. C01f 17/00
U.S. Cl. 423—263
13 Claims

ABSTRACT OF THE DISCLOSURE

Aryl halides, such as chloroxylene, are hydrolyzed to the corresponding ring hydroxylated aryl compounds, such as xylenol, by contacting the aryl halides and steam with a rare earth metal phosphate catalyst, such as lanthanum phosphate, cerium phosphate and neodymium phosphate. A method of preparing the rare earth metal phosphate is also disclosed. The addition of small amounts of copper greatly improves the activity of the catalyst.

This invention relates to a process for the hydrolysis of aryl halides to ring hydroxyl substituted aryl compounds using a rare earth metal phosphate as the catalyst. This invention also relates to a method of preparation of such rare earth metal phosphates and to the addition of copper as a promoter.

A new group of materials has now been discovered which promotes the hydrolysis of aryl halides.

In accordance with one aspect of the invention, an aryl halide is hydrolyzed to produce a ring hydroxyl substituted aryl compound by a process which comprises contacting the aryl halide in the presence of steam with a catalyst comprising at least one rare earth metal phosphate. By a "rare earth metal" in this application is meant at least one rare earth metal selected from the group consisting of lanthanum, cerium and neodymium. Commercially available mixtures of lanthanides are also meant to be included in the term "rare earth metal" with the understanding that the lanthanide portions of these mixtures consist primarily of compounds of lanthanum, cerium and neodymium but may also contain small amounts (usually less than ten percent) of compounds of the other lanthanides such as praseodymium and those elements in the Periodic Table having atomic numbers from 62 to 71. By the term "rare earth metal phosphate" is meant primarily (over 90 percent) a rare earth metal orthophosphate.

The charge stock can be any aryl halide. By an "aryl halide" is meant any aryl compound having at least one halide selected from the group consisting of chlorine, bromine and iodine directly attached to a ring carbon atom. The aryl halide suitably has from one to two aromatic rings which may be condensed or uncondensed and have from one to six halide substituents. Preferably, the aryl halides have from one to two rings, condensed or uncondensed, and from one to two halide substituents. Most preferably the aryl halides are single ring aromatic monohalides. The aryl compounds can suitably have from 6 to 20 carbon atoms, preferably six to ten carbon atoms, and can have other substituents such as alkyl groups and $NO_2$ groups. The alkyl substituents preferably are the so-called lower alkyl groups having from one to four carbon atoms, most preferably methyl. In fact, it is one of the surprising features of this invention that the catalysts described herein are so effective in promoting the hydrolysis of alkylated aryl halides such as chlorotoluene and chloroxylenes.

The preferred aryl halides can be represented by the formula:

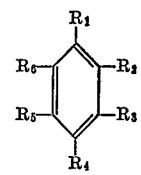

where $R_1$, $R_2$, $R_3$, $R_4$, $R_5$ and $R_6$ are selected from the group consisting of chlorine, bromine, iodine, lower alkyl groups, hydrogen and $NO_2$ where at least one of said substituents is selected from the group consisting of chlorine, bromine and iodine. The preferred compounds represented by the above formula are those wherein only one of the substituents is represented by chlorine, bromine or iodine and from zero to two of the remaining substituents is a lower alkyl group, preferably methyl, and wherein the remaining substituents are hydrogen.

A list of suitable aryl halides for use in the process of this invention include, but are not limited to, the following: chlorobenzene; monochlorotoluenes, i.e., 1-chloro-2-methylbenzene, 1-chloro - 3 - methylbenzene and 1-chloro-4-methylbenzene; monochloroxylenes, i.e., 1-chloro-2,3-dimethylbenzene, 1-chloro - 2,4 - dimethylbenzene, 1-chloro-2,5-dimethylbenzene, 1 - chloro-2,6-dimethylbenzene, 1-chloro-3,4-dimethylbenzene and 1-chloro-3,5-dimethylbenzene; bromobenzene; iodobenzene; paradichlorobenzene; metadibromobenzene; orthodiiodobenzene; 1-chloro-4-bromobenzene; 1-nitro - 4 - chlorobenzene; 1-chloro-2-ethylbenzene; 1-bromo-3-methylbenzene; 1-iodo-4-butylbenzene; 1,4-dimethyl - 2 - bromobenzene; 1,2-dimethyl-2-iodobenzene; 1-methyl - 4 - propyl-2-chlorobenzene; 1,4-dimethyl-2-chloro-5-nitrobenzene; and 1-chloronaphthalene.

The catalyst for this reaction is a rare earth metal phosphate as defined above. Mixtures of rare earth metal phosphates are also suitable catalysts for this reaction. The rare earth metal phosphates are preferably used as catalysts in their unsupported form. However, if desired, the catalysts can be deposited on a suitable support material.

The rare earth metal phosphate can be represented by the general formula given below:

where Me has a valence of plus three and can be lanthanum, cerium, neodymium or mixtures thereof. The preferred rare earth metal phosphates to employ are lanthanum and cerium, and the most preferred rare earth metal phosphate is lanthanum phosphate. As noted above, mixtures of the rare earth metals can also be employed in their phosphate form to catalyze the subject reaction, and mixtures are also preferred for economic reasons since mixtures of rare earth metals which can be converted to the desired phosphate form are available commercially. As noted above, these mixtures can contain minor amounts, about ten percent or less, of other lanthanides.

The novel methods of preparation of the rare earth metal phosphates will be defined later in the specification.

The aryl halide hydrolysis reaction occurs according to the general equation given below:

$$\text{aryl halide} + H_2O \xrightarrow{\text{catalyst}} \text{aryl OH} + H.\text{ halide}$$

where the aryl halide is as defined above and the catalyst employed as as defined below. It is necessary, of course, that water be present, and the volume ratio of water to halogenated aryl charge stock is usually about 0.5:1 to 2:1. The volume ratio of water to aryl halide is, however, not critical and can suitably be from 0.1:1 to 10:1 or more, for example, 100:1 or more, but is preferably from 0.5:1 to 2:1 for economic reasons. Sufficient water should be present to satisfy the stoichiometric requirements of the reaction as indicated by the above equation.

Any suitable hydrolysis reaction conditions can be employed. For example, hydrolysis conditions can include a temperature range of from about 300° to about 600° C., preferably from 375° to 500° C. Below 300° C. the reaction is too slow to be of economic interest, whereas at temperatures above 600° C. the amount of coke by-product produced increases and thus decreases the selectivity of the reaction to form the desired hydroxylated aromatics. When coke is produced it tends to react with the steam under the conditions of the reaction to produce hydrogen which in turn reacts with the aryl halide to give the corresponding aryl compound plus HCl. The reaction pressure is preferably atmospheric but can be from 0.5 to 2.0 atmospheres when the preferred vapor phase reaction occurs. The liquid hourly space velocity of the aryl halide is suitably from 0.1 to 2.0, but is preferably from 0.3 to 1.0 volumes of aryl halide per volume of catalyst per hour.

The reaction is very simple and occurs by passage of the aryl halide, preferably in vapor form, together with water, usually as steam, under the conditions of reaction in the proper amounts through a bed of the rare earth metal phosphate catalyst. The products are cooled, collected and separated by conventional techniques. A fluid bed operation can also be employed if desired.

The rare earth metal phosphates of this invention can be prepared by any suitable method. Certain methods have been found to be particularly desirable in forming the more active forms of the rare earth metal phosphates. The rare earth metal phosphates prepared in accordance with the procedures to be described below are primarily or substantially the orthophosphate form of the metals.

In accordance with the invention, a rare earth metal phosphate is prepared by a process which comprises forming a first aqueous solution of a rare earth metal salt; forming a second aqueous solution of a phosphate ion source having the formula:

$$X_aH_bPO_4$$

where X can be $NH_4$ or a monovalent alkali metal and where $a$ has a value from zero to three and $b$ has a value of three minus $a$; and contacting the first and second aqueous solutions to precipitate the desired rare earth metal phosphate at a pH in the combined solutions of about 1.0 to 5.5.

It is preferred in the above procedure that the first and second solutions be added continuously to a stirred precipitation zone in an amount such that the molar ratio of the rare earth metal to the phosphate ion is from 1:1 to 1:3, preferably from 1:1 to about 1:1.5.

In the alternative, a batch process can be operated wherein the phosphate ion solution is added slowly to the rare earth metal salt solution to precipitate the metal phosphate and the addition of the phosphate ion solution continued until the pH of the combined solutions is from 5.5 to 8.0, preferably 5.5 to 6.5.

The more active forms of the $LaPO_4$ compositions made in accordance with the methods of this invention have X-ray diffraction patterns and infrared absorption spectra which indicate the $LaPO_4$ has a structure which appears to be intermediate between the structure for the hexagonal and monoclinic forms of $LaPO_4$ which are described in the literature (see R. C. L. Mooney, ACTA Crystallographica, vol. 3, p. 339, for the hexagonal data and R. C. L. Mooney, J. Chem. Physics, volume 16, p. 1003, [1948]) or which perhaps more properly can be described as a disordered monoclinic structure.

Any rare earth metal salt which is soluble in the solvent from which the desired metal salts can be precipitated can suitably be employed. Usually the solvent is water, although aqueous solutions of acids, such as nitric acid, can also be employed as well as acetone and alcoholic solutions of the metal salts. Suitable rare earth metal salts include, but are not limited to, the nitrates; chlorides; and salts as the oxides or oxide hydrates, which, when dissolved in acid solutions, form, for example, the nitrates and chlorides. The most preferred salts are the nitrates, as any residual nitrate salts can be decomposed by heating whereas the chlorides must be more carefully removed by added washings.

Examples of suitable rare earth metal salts which can be employed include, but are not limited to: lanthanum nitrate; cerium nitrate; neodymium nitrate; lanthanum chloride; cerium chloride; neodymium chloride; commercially available $(La \cdot RE)_2O_3 \cdot XH_2O$, where RE is a mixture of other lanthanides; commercially available $(La \cdot RE)Cl_3 \cdot 6H_2O$, where RE is a mixture of other lanthanides; and $RE(NO_3)_3 \cdot 5H_2O$, where RE is a mixture of lanthanides.

The phosphate ion source can be any water soluble phosphate having the formula:

$$X_aH_bPO_4$$

where X can be $NH_4$ or a monovalent alkali metal and where $a$ has a value from zero to three and $b$ has a value of three minus $a$.

The preferred phosphate ion source is one wherein X is $NH_4$ and more preferred when X is $NH_4$ and $a$ has a value in solution of at least two.

Examples of suitable phosphate ion source compounds include, but are not limited to: $(NH_4)_3PO_4$ (ammonium phosphate); $(NH_4)_2HPO_4$ (dibasic ammonium hydrogen phosphate); $(N_4)H_2PO_4$ (monobasic ammonium dihydrogen phosphate); $H_3PO_4$ (phosphoric acid); $(Na)_3PO_4$ (sodium phosphate); $(K)_3PO_4$ (potassium phosphate); $Na_2HPO_4$ (sodium hydrogen phosphate); $NaH_2PO_4$ (sodium dihydrogen phosphate); $KH_2PO_4$ (potassium dihydrogen phosphate).

In preparing the rare earth metal phosphates from the rare earth metal salt and phosphate source, appropriate solutions of both components are prepared and the solutions are contacted together to form the desired precipitate. In the continuous process, the molar ratio of the phosphate ion to the rare earth metal cation is at least 1:1. In a batch process, the phosphate source solution is always added to the rare earth metal cation solution, and thus the initial molar ratio of phosphate ion to rare earth metal cation is very low, but the final molar ratio is at least 1:1.

The appropriate solutions of rare earth metal salt and phosphate ion, usually aqueous, can be contacted at any suitable temperature and pressure, and ambient conditions are usually employed. Temperatures within the range of 5° C. to 95° C. can, however, suitably be employed as well as pressures from subatmospheric to 100 p.s.i.g. or more.

It is important for the preparation of the desired rare earth metal phosphates that the pH of the precipitation medium be carefully controlled. In general, the pH of the precipitation medium should be from 1.0 to 5.5 during precipitation of the bulk of the rare earth metal phosphate. Thereafter, the pH may be increased by the addition of a suitable alkaline material to a level from 5.5 to 8.0, usually 5.5 to 6.5. Suitable examples of alkaline materials include, but are not limited to: $NH_4OH$, alkali metal hydroxides such as NaOH, KOH and $NH_3$ gas.

The rare earth metal phosphates can suitably be prepared in a batch process or, preferably, in a continuous process.

BATCH PROCESS

In a batch process, the phosphate ion source solution is added slowly with vigorous stirring to minimize pH gradients to the rare earth metal salt solution. Preferably, the pH of the rare earth metal salt solution is initially adjusted to a level of about 4.5 to 5.0 by the addition of acid, such as $HNO_3$ if a nitrate salt is used. The pH of the phosphate ion source solution is adjusted to a level of 7.5 to 9.5 by the addition of an alkaline material such as $NH_4OH$ or urea, or by the addition of $NH_3$ gas which forms $NH_4OH$ in situ.

In the preferred form where the earth metal nitrate is employed and the phosphate source is $(NH_4)_2HPO_4$ or $(NH_4)H_2PO_4$ the addition of the phosphate solution to the nitrate salt solution results in a lowering of the pH of the combined solutions since $HNO_3$ is formed which ionizes to lower the pH as per the following equation using lanthanum nitrate as an example:

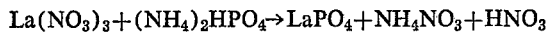

$$La(NO_3)_3 + (NH_4)_2HPO_4 \rightarrow LaPO_4 + NH_4NO_3 + HNO_3$$

As the rare earth metal phosphate precipitates, the pH continues to decrease until all of the rare earth metal salt has been converted to the phosphate. The pH of the solution will obviously thereafter increase if the addition of the $(NH_4)_2HPO_4$ is continued. The final mole ratio of rare earth metal to phosphate ion is suitably from 1:1 to 1:3 in the solution.

For reasons which are not understood, metal phosphates which are more active for the hydrolysis reaction result when the pH of the combined solutions is maintained while precipitation is occurring at some constant pH value within the range of 2.5 to 4.0 after such value is initially reached. The pH can suitably be maintained at a desired constant level by the addition of an alkaline material such as $NH_4OH$ or $NH_3$ gas. After the precipitation of the metal phosphate is complete, the pH may be allowed to increase to a level of 5.5 to 8.0, usually 5.5 to 6.5, before separation of the precipitate.

CONTINUOUS PROCESS

In the preferred continuous process for the preparation of the metal phosphates, portions of the rare earth metal salt solution and phosphate ion source solution having pH's within the range shown above for the batch process are added together in a ratio such that the pH of the resulting combined solutions decreases. If the phosphate source solution has a pH of greater than nine and is added in a greater than 1:1 proportion to the rare earth metal salt solution having a pH of about 4.7, then the pH of the combined solutions tends to increase and the desired precipitate is not formed. If the phosphate source has a pH of about 7.5 to 9.0, then it can suitably be added in a molar ratio slightly greater than 1:1 to the rare earth metal salt solution and the pH of the combined solutions decreases and results in the precipitation of the desired phosphate. Once the pH level decreases to a value within the range from 5.0 to 2.0, the molar ratio of the phosphate source solution to the rare earth metal salt solution can be increased, if desired, so long as the pH is maintained at some value, preferably a constant value, within the range of 5.0 to 2.0, preferably 4.0 to 2.5. There is, of course, continuous and vigorous mixing as the two solutions enter the precipitation zone to reduce as much as possible any pH gradient in the precipitation zone.

The concentration of rare earth metal salt in the starting solutions for either batch or continuous operation is not critical and can be any value where the salt stays in solution under the conditions of the reaction. Preferably a dilute solution of salt is used, such as a concentration of 2.0 to 15.0 weight percent salt so as to more easily control the pH gradient in the combined solutions by vigorous stirring.

The concentration of phosphate ion source material in the starting phosphate ion source solution is similarly not critical but for similar reasons is suitably from 1.5 to 20 weight percent.

It is further preferred in the continuous operation to adjust the pH of the initial rare earth metal salt and phosphate ion solutions as described above for the batch operation and then continuously monitor the pH of the combined solutions and to maintain the pH at some desired constant pH level within the range of 5.0 to 2.0 throughout the remainder of the addition step when such desired pH level is reached. The desired pH level should be attained as quickly as possible after the start of the addition step by the use of proper proportions of the initial salt and phosphate ion solutions. It is further preferred in the continuous operation to add the rare earth metal salt and phosphate ion solutions relatively fast to effect rapid crystallization of the rare earth metal phosphate. Further, the molar ratio of the rare earth metal to the phosphate ion is suitably within the range from about 1:1 to 1:3, but is preferably about 1:1 to 1:1.5. The pH level can be maintained by the addition of a suitable alkaline material as noted above in connection with the batch process. The pH can be monitored by any suitable method known in the art and the particular method of monitoring is not critical. Suitable pH monitoring meters are available commercially.

Usually in a continuous operation a relatively small vessel is employed as the precipitation zone. Vigorous stirring is employed and the desired metal phosphate precipitates almost immediately on the addition of the two streams into the precipitation zone. To aid in this, the two solutions are added to the precipitation zone in close proximity to each other and to the mixing means. A continuous overflow is normally maintained and aliquot portions of the precipitate and mother liquor are removed to a holding zone where the pH is adjusted by the addition of a suitable alkaline material to a level of 5.5 to 8.0, usually 5.5 to 6.5, prior to separation of the precipitate from the mother liquor. Usually the pH is adjusted in the holding zone shortly after the precipitate enters the holding zone, which is usually within five minutes to five hours.

In addition, it has been found that ammonium phosphate is most conveniently obtained by passing $NH_3$ gas into a dilute solution of $H_3PO_4$ (1.5 to 20 weight percent $H_3PO_4$ in water) whence the hydrogen in the acid is replaced by $NH_4$. A continuous series of ammonium phosphate products is obtained as more and more of the hydrogen is replaced. This is reflected in an increase in the pH of the solution as the $NH_4$ content is increased. It is preferred to add $NH_3$ gas until the pH is in the range of 8.0 to 9.0, most preferably about 8.7, and to use this solution as the phosphate ion source.

The rare earth metal phosphate precipitate can then be suitably separated by filtration or centrifugation, washed with water to remove water-soluble salts such as $NH_4NO_3$ if such is formed, and dried under suitable conditions such as a temperature of 110° to 120° C. in air. The dried phosphate can be calcined to activate it for catalytic purposes such as for the hydrolysis of aryl halides as described herein. Suitable calcination temperatures include a temperature from 500° to 800° C., preferably 550° to 650° C., for a time of from 4 to 24 hours or more.

The invention will be further described with reference to the following experimental work. All hydrolysis experiments were carried out by using a 22" x ¾" internal diameter tubular quartz reactor heated by means of a furnace completely surrounding the vertically placed tube. The temperatures in the catalyst bed were controlled using a thermo-electric temperature regulator. Internal temperatures were measured by means of a concentric thermocouple well running the length of the reactor. The aryl halide feed and water were introduced into the reactor separately using calibrated syringe pumps. Water was pumped into a stainless steel steam generator where it was vaporized and heated to 300° C. The aryl halide feed was preheated and mixed with the steam at the top of the reactor. The top eight inches of the reactor were packed with alundum pellets to serve as a preheat zone.

For product analysis the total effluent from the reactor was condensed in an ice trap. The aqueous and organic phases were then dissolved in a sufficient amount of acetone to give a single phase. This solution was analyzed chromatographically using a Varian 1500 temperature programmed hydrogen flame detector. Gaseous products were analyzed by mass spectrometry. The catalysts were regenerated between experiments in air at reaction temperature. The pressure in all runs was atmospheric and the liquid hourly space velocity of the aryl halide was about 0.15 to 0.3.

Example 1

The catalyst for this example was prepared as follows:

(1) 144 grams (⅓ mole) of $La(NO_3)_3 \cdot 6H_2O$ was dissolved in 1000 cc.'s of distilled water (pH=4.7);

(2) 88 grams (⅔ mole) of $(NH_4)_2HPO_4$ were dissolved in 500 cc.'s of distilled water;

(3) solution (2) was slowly added to solution (1) with vigorous stirring and the pH decreased as a white precipitate was formed. A minimum pH of 1.4 was attained and upon continued addition of the phosphate solution the pH began to increase. After all of the solution (2) was added, the pH was 2.7 (total time of addition was 30 minutes);

(4) $NH_4OH$ solution was then added to adjust the pH to 6.0;

(5) the precipitate was then separated from the mother liquor by filtration and was washed on the filter with eight liters of water;

(6) the precipitate was removed from the filter and dried for 18 hours in moving air in an oven at 120° C.; and (7) the dried sample was calcined in air at 500° C. for 16 hours. The surface area of the calcined product was 136 m.²/gram.

In this and the other examples the mixing was in a polyethylene vessel with stirring with Teflon coated propeller-type stirrers.

A series of runs was made using the catalyst of Example 1 which was calcined at 500° C. for the conversion of o-chlorotoluene at varying reaction conditions. The catalyst was regenerated between runs by burning in air at the reaction temperature. The results are summarized in Table I below.

Referring to Table I below, it can be seen that an increase in reaction temperature results in an increase in conversion (compare Example 6 with Examples 5, 3 and 2). The product in this example and in the other examples in this application where a monochlorotoluene was used as the charge stock was a mixture of the various hydroxylated toluene isomers. The selectivity is higher at the lower temperatures. An increase in space velocity results in a decrease in conversion and selectivity (Examples 3 and 4).

Catalysts similar to that of Example 1 were prepared except the pH of the phosphate source was adjusted over the range of 6.8 to 8.3 and these catalysts were found to be active for the hydrolysis of aryl halides.

TABLE I.—HYDROLYSIS OF o-CHLOROTOLUENE USING A $LaPO_4$ CATALYST

| Example number | 2 | 3 | 4 | 5 | 6 | 7 |
|---|---|---|---|---|---|---|
| Reaction temp., ° C | 500 | 475 | 475 | 450 | 425 | 425 |
| Volume ratio liquid $H_2O$ to liquid o-chlorotoluene | 2 | 2 | 2 | 2 | 2 | 2 |
| LHSV [1] | 0.291 | 0.291 | 0.582 | 0.291 | 0.291 | 0.291 |
| Time, minutes | 120 | 120 | 120 | 120 | 120 | 360 |
| Conversion [2] | 24.4 | 23.6 | 15.3 | 18.0 | 12.8 | 12.4 |
| Selectivity [3] | 83.8 | 94.1 | 89.2 | 94.0 | 96.4 | 95.3 |
| Yield [4] | 20.3 | 22.1 | 13.7 | 16.8 | 12.3 | 11.8 |

[1] LHSV=Liquid hourly space velocity in these and other examples is based on the aryl halide.
[2] Conversion in this application means the weight percent aryl halide converted to all products except coke.
[3] Selectivity in this application means the weight percent of reacted aryl halide going to the desired hydroxylated aryl compounds.
[4] Yield in this application means yield of hydroxylated aryl compounds calculated by multiplying conversion times selectivity.

A series of runs was then made using the catalyst of Example 1 which was calcined at 600° C. The results are shown in Table II below.

TABLE II.—HYDROLYSIS OF VARIOUS ARYL HALIDES USING A $LaPO_4$ CATALYST

| Example number | 8 | 9 | 10 | 11 | 12 |
|---|---|---|---|---|---|
| Charge aryl halide | (1) | (1) | (2) | (3) | (4) |
| Reaction Temp., ° C | 500 | 475 | 475 | 475 | 475 |
| Vol. ratio liquid $H_2O$ to liquid aryl halide | 2 | 2 | 2 | 2 | 2 |
| LHSV | 0.291 | 0.291 | 0.291 | 0.291 | 0.291 |
| Time, min | 120 | 120 | 150 | 120 | 120 |
| Conversion | 25.2 | 23.8 | 20.4 | 20.3 | 22.7 |
| Selectivity | 86.4 | 92.6 | 100 | 98.9 | 94.5 |
| Yield | 21.8 | 22.0 | 20.4 | 20.1 | 21.5 |

[1] o-Chlorotoluene.
[2] Chlorobenzene.
[3] m-Chlorotoluene.
[4] p-Chlorotoluene.

Comparing Examples 2 and 3 of Table I with Examples 8 and 9 of Table II shows that the difference in catalyst calcining temperature had little effect. Examples 10–12 in Table II show various aryl halide charge stocks can be employed successfully.

Example 13

The catalyst of Example 1 was employed using the same conditions as Example 3 for the hydrolysis of 2-chloro-para-xylene. After 120 minutes of reaction time the selectivity, conversion and yield of hydroxylated xylene isomers (mostly 2-hydroxyl-para-xylene) was 95.5, 30.2 and 28.8 weight percent, respectively. After five hours, the conversion and selectivity were 27.0 and 91.8 weight percent, respectively, resulting in a yield of 24.8 weight percent.

Example 14

The catalyst for this example was prepared in a manner similar to that for Example 1 above except the lanthanum to phosphorus ratio in the starting solutions was 1:1.5 and the pH of the initial diammonium hydrogen phosphate solution was adjusted to 9.5 using $NH_4OH$. The minimum pH during addition of the phosphate source was 2.4 and the pH after the addition of the phosphate was 6.0 without the need for adjustment. The surface area of the dried and calcined catalyst was 114 square meters per gram.

Example 15

The catalyst of Example 14 was employed for the hydroylsis of 2-chloro-para-xylene under the same conditions as in Example 13. After 120 minutes the conversion and selectivity to the formation of a mixture of the various hydroxylated xylene isomers was 18.7 and 92.4 weight percent respectively for a yield of 17.3 weight percent. In all examples where a monochloroxylene was used as the charge stock, the product was a mixture of the various hydroxylated xylene isomers.

Example 16

Example 15 was repeated except the temperature was reduced to 460° C. and the LHSV was reduced to 0.148. The conversion and selectivity after 120 minutes were 22.3 and 93.3 weight percent, respectively, for a yield of 20.8 weight percent. After six hours the conversion, selectivity and yield were 21.0, 93.4 and 19.6 weight percent, respectively.

Example 17

The preparation of the catalyst for this example was similar to the preparation for the catalyst of Example 1 except cerium nitrate was used in place of lanthanum nitrate. The pH of the initial cerium nitrate solution was 3.8. The surface area of the dry and calcined catalyst was 111 square meters per gram.

Example 18

The catalyst of Example 17 was employed for the hydrolysis of o-chlorotoluene using the same conditions as in Example 2 above. The conversion, selectivity and yield of methylphenols were 11.0, 74.4 and 8.2 weight percent, respectively.

Example 19

This catalyst preparation was very similar to that for Example 14 above except the lanthanum to phosphorus ratio was 1.2 and the pH of the solution after the addition of all of the phosphate was 7.0, which was not thereafter adjusted. The surface area of the dried and calcined catalyst was 101 square meters per gram.

Example 20

The catalyst of Example 19 was employed for the hydrolysis of 2-chloro-para-xylene under the conditions of Example 15. The conversion and selectivity to the formation of the hydroxylated xylene isomers was 21.8 and 90.0 weight percent, respectively, for a yield of 19.6 weight percent.

A lanthanum phosphate catalyst was made using $H_3PO_4$ as the phosphate source, but the activity of this catalyst for the hydrolysis or ortho-chlorotoluene was lower than $LaPO_4$ catalysts prepared from $NH_4H_2PO_4$ or $(NH_4)_2HPO_4$.

Example 21

A mixed lanthanum-cerium phosphate catalyst was prepared by:

(1) Dissolving 130 grams of $La(NO_3)_3 \cdot 6H_2O$ in 1500 cc.'s of water (pH=6.9);

(2) Dissolving 14 grams of $Ce(NO_3)_3 \cdot 6H_2O$ in 500 cc.'s of distilled water (pH=3.6);

(3) The solutions of (1) and (2) were admixed (pH=5.6) which was further diluted to 5 liters (pH adjusted to 4.5 using $HNO_3$);

(4) Dissolving 88 grams of $(NH_4)_2HPO_4$ in 2000 cc.'s of distilled water with stirring. The pH of the phosphate solution was 8.1 and was adjusted to 9.3 with $NH_4OH$;

(5) The phosphate solution was slowly added to the La-Ce salt solution while stirring constantly. A precipitate formed. The minimum pH was 3.9 and the final pH was 6.0 after 1500 cc.'s of the phosphate solution were added (volume addition stopped at this point);

(6) The precipitate was filtered and washed with six liters of distilled water; and (7) The precipitate was dried overnight at 120° C. and then calcined overnight at 500° C.

Example 22

The catalyst of Example 21 was employed for the hydrolysis of 2-chloro-para-xylene at 475° C., an LHSV of 0.291 and a time of 2 hours. The conversion was 13.1 percent; the selectivity was 96.6 for a yield of 12.7 percent.

Example 23

The catalyst for this example was prepared using a mixture of rare earth metal nitrates. The mixture of rare earth metal nitrates was cerium rich and contained the following weight percent rare earth metals: 28.0 percent lanthanum, 38.9 percent cerium, 3.7 percent praseodymium and 11.0 percent Nd. The preparation was similar to that for Example 1 above except an aqueous mixture of the rare earth metal nitrates was employed; the initial pH of the aqueous rare earth metal was 5.1 and the pH of the solution when all of the diammonium hydrogen phosphate was added was 3.4 and was thereafter adjusted to a pH of 6.0 using $NH_4OH$. The surface area of the catalyst after drying and calcining at 500° C. for 16 hours was 138 square meters per gram.

The catalyst of Example 23 was employed in a series of runs under varying conditions to hydrolyze 2-chloro-para-xylene. The results are summarized in Table III below.

TABLE III.—HYDROLYSIS OF 2-CHLORO-PARA-XYLENE USING A MIXED RARE EARTH METAL PHOSPHATE RICH IN CERIUM

| Example number | 24 | 25 | 26 | 27 |
|---|---|---|---|---|
| Temperature, °C | 475 | 475 | 450 | 500 |
| Vol. ratio of liquid $H_2O$ to liquid aryl halide | 2 | 2 | 2 | 2 |
| LHSV | 0.291 | 0.146 | 0.146 | 0.582 |
| Time, minutes | 180 | 180 | 240 | 120 |
| Results: | | | | |
| Conversion, wt. percent | 5.2 | 16.0 | 9.1 | 5.5 |
| Selectivity to xylenols, wt. percent | 93.5 | 90.3 | 92.8 | 72.9 |
| Yield of xylenols, wt. percent | 4.8 | 14.4 | 8.4 | 4.0 |

The catalyst of Example 23 was employed in a second series of runs under varying conditions to hydrolyze o-chlorotoluene to form a mixture of methylphenols. The results are summarized in Table IV below.

TABLE IV.—HYDROLYSIS OF o-CHLOROTOLUENE USING A MIXED RARE EARTH METAL PHOSPHATE RICH IN CERIUM

| Example number | 28 | 29 | 30 |
|---|---|---|---|
| Temperature, °C | 500 | 475 | 475 |
| Vol. ratio of liquid $H_2O$ to liquid aryl halide | 2 | 2 | 2 |
| LHSV | 0.291 | 0.291 | 0.148 |
| Time, minutes | 180 | 180 | 180 |
| Results: | | | |
| Conversion, wt. percent | 11.2 | 7.2 | 12.6 |
| Selectivity, wt. percent | 86.3 | 94.2 | 91.0 |
| Yield, wt. percent | 9.7 | 6.7 | 11.5 |

Example 31

The catalyst for this example again contained a mixture of rare earth metals and analysis of the mixture indicated 51.0 weight percent lanthanum, 4.9 weight percent cerium, 21 weight percent neodymium and 6.6 weight percent praseodymium, all present in the oxide and hydrate forms as indicated by the manufacturer. The preparation was similar to that for Example 32 except the rare earth mixture was initially dissolved in an aqueous dilute solution of $HNO_3$. The rare earth metal to phosphorus ratio was 1:1.7 in the initial solutions, the initial pH's of the rare earth metal solutions and phosphate solutions were 4.1 and 9.0 respectively, and the pH of the solution after the addition of the phosphate was 6.0. The surface area after drying and calcining was 103 square meters per gram.

A series of runs was made using the catalyst of Example 31 under varying conditions to hydrolyze 2-chloroparaxylene. The results are summarized in Table V below.

TABLE V.—HYDROLYSIS OF 2-CHLORO-PARA-XYLENE USING A MIXED RARE EARTH METAL PHOSPHATE RICH IN LANTHANUM

| Example number | 32 | 33 |
|---|---|---|
| Temperature, °C | 475 | 460 |
| Vol. ratio liquid H₂O to liquid aryl halide | 2 | 2 |
| LHSV | 0.291 | 0.148 |
| Time, minutes | 180 | 180 |
| Results: | | |
| Conversion, wt. percent | 12.3 | 13.7 |
| Selectivity, wt. percent | 92.8 | 95.3 |
| Yield, wt. percent | 11.4 | 13.0 |

Examples 23–33 show that mixtures of rare earth metal phosphates can be employed in the process of the subject invention.

Example 34

The catalyst preparation of Example 1 was repeated except neodymium nitrate was employed in place of the lanthanum nitrate. The pH of the neodymium nitrate solution was 4.9. The surface area of the dried catalyst calcined at 500° C. was 105 square meters per gram.

Example 35

The catalyst of Example 34 was utilized for the hydrolysis of chloro-para-xylene under the conditions of Example 3. The conversion was 9.2 weight percent of the chloro-para-xylene with a selectivity to the production of xylenols being 100 weight percent.

Example 36

The catalyst for this example was prepared in a manner similar to that for Example 1 above except lanthanum chloride was used in place of lanthanum nitrate and the lanthanum to phosphorus ratio in the initial solutions was 1:1.5. The pH of the initial phosphate solution was adjusted to 9.0. The pH when all of the phosphate solution was added was 6.0 so that no final adjustment was necessary. The surface area of the dried and calcined catalyst was 100 square meters per gram.

Example 37

The catalyst of Example 36 was used for the hydrolysis of chloro-para-xylene under the same conditions as Example 4 above. The weight percent conversion was 11.4 and the selectivity was 94.6.

Example 37 shows that rare earth metal chlorides can be employed in place of rare earth metal nitrates.

Example 38

The catalyst for this example was prepared in a manner similar to that for Example 1 above except disodium hydrogen phosphate was used as the phosphate source. The pH of this solution was 8.9. The pH of the solution after the addition of all the phosphate was 3.3 and the final pH was adjusted to 6.5 using NH₄OH.

Example 39

The catalyst of Example 38 was tested for the hydrolysis of chloro-para-xylene under the same conditions as Example 66 above. The weight percent conversion was 7.8 with 97.7 weight percent selectivity to the formation of the desired hydroxylated compounds.

Example 40

The catalyst for this example was prepared in a manner similar to that for Example 38 except trisodium phosphate was used as the phosphate source which had an initial pH of 12.7. The pH after the addition of the phosphate source was 8.0 which was not thereafter adjusted. The molar ratio of lanthanum to phosphorus was 1:1.3.

Example 41

The catalyst of Example 40 was tested for the hydrolysis of chloro-para-xylene under the same conditions of Example 39. Conversion was 3.3 weight percent and the selectivity was 90.3 weight percent.

Example 42

The catalyst for this example was prepared by mixing together in a dry state 144 grams of powdered $$La(NO_3)_3 \cdot 6H_2O$$

and 39 grams of $(NH_4)_2HPO_4$. A small amount of water was added sufficient to form a paste which was stirred to insure an intimate admixture of the salts. The paste was dried in an oven at 120° C. in moving air and was stirred frequently during the drying step. The dried product was calcined at 500° C. for 16 hours.

Example 43

A 10–20 mesh sieved sample of the catalyst of Example 42 was tested for the hydrolysis of chloro-para-xylene at 460° C.; a steam to chloro-para-xylene mole ratio of 2:1; a liquid hourly space velocity of 0.148 and a reaction time of two hours. The conversion was 11.2 weight percent and the selectivity was only 56.4 percent.

A comparison of Examples 42 and 43 with the other examples in this specification show that other methods of preparation of the rare earth metal phosphates can be employed.

Example 44

The catalyst for this example was prepared as follows:
(1) 144 grams of $La(NO_3)_3 \cdot 6H_2O$ were dissolved in 5 liters of water (pH=5.9 and was adjusted to 4.5 with $HNO_3$);
(2) 78 grams of $H_3PO_4$ (85 percent) was added to two liters of water and the pH was adjusted to 8.7 with $NH_3$ gas. The total volume of this solution was 2030 cc.'s;
(3) 500 cc.'s of water and 500 cc.'s of the lanthanum nitrate solution were placed into a mixing vessel. The pH of this solution was 4.5;
(4) The phosphate solution was added slowly to the solution in the mixing vessel with vigorous stirring and the pH decreased slowly as a white precipitate was formed. A minimum pH of 2.15 was attained, after which the pH began to increase;
(5) When a pH of 3.0 was reached, the lanthanum nitrate solution and the phosphate solution were added simultaneously and the relative rates of addition were adjusted to maintain the pH constant at 3.0 until all of the lanthanum nitrate solution was added. The slurry in the mixing vessel was stirred vigorously to minimize pH gradients during the entire addition step;
(6) After all of the lanthanum nitrate solution was added, the addition of the phosphate solution was continued until the pH reached 6.5. At this point, 1770 cc.'s of the phosphate solution had been used, and this corresponds to a ratio of La:P of 1:1.75 in the final mixed slurry;
(7) The precipitate was separated by filtration and was washed on the filter with six liters of water;
(8) The filter cake was broken into suitable sized pieces and dried in moving air at 120° C. for 16 hours; and
(9) The dried catalyst was calcined at 500° C. in air for 16 hours.

Example 45

The catalyst of Example 44 was tested for the hydrolysis of 2-chloro-para-xylene at 475° C., a liquid hourly space velocity of 0.291, a water to 1-chloro-para-xylene mole ratio of two and for a time of two hours. The conversion of 2-chloro-para-xylene was 16.8 weight percent with a selectivity to the formation of 2-hydroxy-para-xylene of 96.8 weight percent. The yield of the xylenols was therefore 16.3 percent.

Example 46

The catalyst for this example was prepared as follows:

(1) 720 grams of $La(NO_3)_3 \cdot 6H_2O$ were dissolved in 25,000 cc.'s of water and the pH was adjusted to 4.7 with $HNO_3$;

(2) 255 grams of $H_3PO_4$ (85 percent) were diluted to 12,500 cc.'s with water and the pH was adjusted to 8.7 by bubbling $NH_3$ gas into the solution;

(3) 1500 cc.'s of water were placed into a mixing vessel (about 15 liters) and 25 cc.'s of the $La(NO_3)_3 \cdot 6H_2O$ solution was added;

(4) The phosphate solution was added slowly with stirring together with a small amount of additional lanthanum nitrate solution as needed until the pH of the mixed solutions reached 3.0;

(5) The lanthanum nitrate and phosphate solutions were then added simultaneously at substantially constant rates of about 200 cc./min. and 100 cc./min. respectively; the pH was maintained constant at about 3.0 by adding $NH_3$ gas as needed;

(6) When the mixing vessel became nearly full, about 8250 cc.'s were withdrawn to a holding vessel while the addition of the two solutions to the mixing vessel was continued (this withdrawal procedure was actually used five times until all of the starting solutions had been added to the mixing vessel);

(7) The pH of the portions removed to the holding vessels was adjusted immediately to 6.5 with $NH_3$ gas and the precipitate was separated by filtration and washed on the filter with water;

(8) The filter cake from each of the five filters was broken up and the pieces were admixed and dried in moving air in an oven at 120° C. for 16 hours; and (9) The dried catalyst was calcined at 500° C. for 16 hours.

A series of runs was made using the catalyst of Example 46 for the hydrolysis of 2-chloro-para-xylene. The results are shown in Table VI below.

TABLE VI.—HYDROLYSIS OF 2-CHLORO-PARA-XYLENE

| Example number | Temp., °C. | $H_2O$/2-chloro-p-xylene mole ratio | LHSV | Time, hrs. | Conversion, wt. percent | Selectivity, wt. percent |
| --- | --- | --- | --- | --- | --- | --- |
| 47 | 475 | 1 | 0.296 | 2 | 25.3 | 88.6 |
| 48 | 450 | 1 | 0.296 | 2 | 22.6 | 97.4 |
| 49 | 425 | 1 | 0.296 | 2 | 15.5 | 100 |
| 50 | 425 | 0.5 | 0.296 | 2 | 14.0 | 99.5 |
| 51 | 425 | 2 | 0.296 | 2 | 17.1 | 100 |
| 52 | 400 | 1 | 0.296 | 3 | 11.2 | 100 |

Example 53

The preparation of the catalyst of Example 46 was repeated except the calcination temperature was 600° C.

A series of runs was made using the catalyst of Example 53 for the hydrolysis of 2-chloro-para-xylene. The results are shown in Table VII following.

TABLE VII.—HYDROLYSIS OF 2-CHLORO-PARA-XYLENE TO 2-HYDROXY-PARA-XYLENE

| Ex. No. | Temp., °C. | $H_2O/C_8$ [a] mol ratio | LHSV | Time, hrs. | Conversion, wt. percent | Selectivity, wt. percent |
| --- | --- | --- | --- | --- | --- | --- |
| 54 | 475 | 1 | 0.296 | 2 | 31.2 | 87.7 |
| 55 | 450 | 1 | 0.296 | 2 | 28.0 | 98.0 |
| 56 | 425 | 1 | 0.296 | 2 | 19.6 | 100 |
| 57 | 400 | 1 | 0.296 | 2 | 14.0 | 100 |
| 58 | 425 | 1 | 0.148 | 2 | 21.5 | 100 |
| 59 | 425 | 1 | 0.573 | 2 | 10.7 | 100 |
| 60 | 400 | 1 | 0.148 | 2 | 14.5 | 100 |
| 61 | 400 | 1 | 0.573 | 2 | 7.4 | 100 |
| 62 | 375 | 1 | 0.148 | 2 | 10.3 | 100 |
| 63 | 375 | 1 | 0.296 | 2 | 7.3 | 100 |
| 64 | 375 | 1 | 0.573 | 2 | 5.1 | 100 |

[a] $C_8$ = 2-chloro-para-xylene.

A second series of runs was made using the catalyst of Example 53 using different charge stocks. The results of these runs are shown in Table VIII below.

TABLE VIII

| Example number | Charge stock | Temp., °C. | $H_2O$/charge stock mol ratio | LHSV, v./v./hr. | Time, hours | Conversion, wt. percent | Selectivity, wt. percent |
| --- | --- | --- | --- | --- | --- | --- | --- |
| 56 | 2-chloro-p-xylene | 425 | 1 | 0.296 | 2 | 19.6 | 100 |
| 65 | o-Chlorotoluene | 425 | 1 | 0.296 | 2 | 13.6 | 100 |
| 66 | m-Chlorotoluene | 425 | 1 | 0.296 | 2 | 14.6 | 100 |
| 67 | p-Chlorotoluene | 425 | 1 | 0.296 | 2 | 15.3 | 100 |
| 68 | Chlorobenzene | 425 | 1 | 0.296 | 2 | 10.1 | 100 |
| 69 | do | 450 | 1 | 0.296 | 2 | 26.8 | 100 |

Other catalysts were made in a manner similar to the continuous procedure of Example 46 except the pH of the phosphate solution was from 6.0 to 9.0 and the constant pH maintained during precipitation varied from a low of about two to a high of five and active catalysts for the hydrolysis of 2-chloro-para-xylene were obtained.

In the preparation of the catalyst for Example 46, the rate of addition of the lanthanum and phosphate solutions in step (5) was 200 cc./min. and 100 cc./min. respectively. This resulted in a La/P mole ratio of 1:1.18. Additional preparations were made where the La/P ratio was maintained at 1:1.18 and where the rate of addition of the lanthanum solution varied from 90 to 500 cc./minute while the rate of addition of the phosphate solution varied accordingly from 45 to 250 cc./minute. The volume ratio of the lanthanum to phosphate solution was, of course, maintained at about 2:1. In general, the more active catalysts were prepared using the higher rates of addition.

Example 70

The catalyst for this example was prepared as follows:

(1) 144 grams of $La(NO_3)_3 \cdot 6H_2O$ were dissolved in two liters of water;

(2) 40 grams of urea ($NH_2CONH_2$) were dissolved in two liters of water;

(3) Solutions (1) and (2) were combined and water was added to bring the total volume to five liters (the pH of the combined solution was 5.53);

(4) 45 grams of $H_3PO_4$ (85 percent) were diluted to 2½ liters with water (pH = 1.46);

(5) The lanthanum-urea solution and the phosphoric acid solution were added slowly, with stirring, to a mixing vessel containing one liter H$_2$O. The pH decreased rapidly as a white precipitate was formed;

(6) When the pH reached 3.0, the two solutions were added simultaneously at the rate of 200 cc./min. and 100 cc./min. respectively and NH$_3$ gas was added as needed to maintain a constant pH of 3.0;

(7) The mixing zone was stirred vigorously to minimize pH gradients. After both solutions had been exhausted, stirring was continued for five minutes, and the pH of the mixed slurry was 3.2. (The La:P ratio in the final mixed slurry was 1:1.18, based upon the composition of the solutions used in the preparation.);

(8) NH$_3$ gas was added until the pH reached 6.2, after which the precipitate was separated by filtration. The precipitate was washed on the filter with one liter water and the filter cake was dried at 120° C. for 16 hours; and (9) The dried precipitate was calcined in air at 500° C. for 16 hours.

Example 71

The catalyst of Example 70 was used for the hydrolysis of 2-chloro-para-xylene using a steam to charge stock molar ratio of 1:1; a liquid hourly space velocity of 0.296 based, as usual, on the 2-chloro-para-xylene; for a time of two hours and a temperature of 450° C. The conversion of 2-chloro-para-xylene was 14.2 weight percent; the selectivity to 2-hydroxy-para-xylene was 97.6 weight percent, for a yield of 2-hydroxy-para-xylene of 14 percent.

In another aspect of this invention, an aryl halide as defined above is hydrolyzed to produce a ring hydroxyl substituted aryl compound by a process which comprises contacting the aryl halide in the presence of water under hydrolysis conditions with a catalyst comprising at least one rare earth metal phosphate and a promoting amount of copper.

It has been found quite surprisingly that very small amounts of copper will greatly promote the activity of the rare earth metal catalysts of this invention for the hydrolysis of aryl halides. For example, has been found that as little as 200 p.p.m. (parts per million parts by weight of catalyst) of copper added to a LaPO$_4$ catalyst has increased the conversion of 2-chloro-para-xylene six-fold with little loss in selectivity at 400° C. The addition of 1000 p.p.m. of copper has resulted in similar increases in conversion but the selectivity decreases. A suitable range of copper content is from about 50 to about 1000 p.p.m. by weight of the catalyst, with the preferred copper content being from about 100 to 500 p.p.m. by weight of the catalyst.

The copper can be added to the rare earth metal phosphate by any suitable procedure. The particular method of addition of the copper does not appear to be critical. For example, the copper can suitably be added to a preformed lanthanum phosphate catalyst by impregnation of the lanthanum phosphate with a solution, preferably aqueous, of a suitable copper salt such as copper nitrate. Other copper salts can also be employed, such as copper acetate, copper chloride and copper sulfate, but are not as preferred since it is more difficult to remove the anion portions. The copper promoted catalyst can also suitably be prepared by coprecipitating the copper with the rare earth metal during the preparation of the rare earth metal phosphate. Thus, a copper salt, preferably copper nitrate, can be added in any desired concentration to the solution of the rare earth metal salt, i.e., lanthanum nitrate, and then precipitating the rare earth metal phosphate by any suitable method, such as those disclosed earlier in this specification. The copper will precipitate together with the rare earth metal and become incorporated into the final composition.

The final composition should then be dried and calcined as noted above.

This aspect of the invention is illustrated by the following experimental work.

Example 72

The catalyst of this example was prepared as follows:

(1) 288 grams of La(NO$_3$)$_3$·6H$_2$O was dissolved in 10 liters of distilled water. The pH of this solution was 5.3 and this was adjusted to 4.7 by the addition of HNO$_3$.

(2) 90 grams of H$_3$PO$_4$ was mixed with five liters of distilled water. The pH of this solution was 1.45 and was adjusted to 8.7 by bubbling in NH$_3$ gas.

(3) 1500 cc's of distilled water was added to a polypropylene mixing vessel and solutions (1) and (2) were added slowly, with vigorous stirring, in proportions which were adjusted to yield a pH of 3.0 in the mixing vessel. When a pH of 3.0 was attained, solution (1) was added at the rate of 200 cc./min. and solution (2) at the rate of 100 cc./min., with vigorous stirring. The pH of the mixing zone was monitored and maintained at a constant value of 3.0 by bubbling in NH$_3$ gas as needed.

When solutions (1) and (2) were exhausted, NH$_3$ gas was bubbled into the slurry until the pH reached 6.2. The precipitate was then separated by filtration and washed on the filter with two liters of distilled water, the pH of which was 6.1.

The filter cake was broken into chunks and dried in moving air at 120° C. for approximately 20 hours. The dried product was then calcined in air at 500° C. for 16 hours.

Example 73

Example 71 was repeated except the catalyst of Example 72 was used and the reaction temperature was reduced to 400° C. The conversion of 2-chloro-para-xylene was only 2.6 weight percent and the efficiency to the formation of 2,5-dimethylphenol was 100 percent for a yield of phenol of 2.6 weight percent. The results are shown in Table IX below.

A series of catalysts were prepared by impregnating the catalyst of Example 72 with an aqueous solution of copper nitrate using the method of incipient wetness to deposit the following nominal amounts of copper: 200 p.p.m. and 1000 p.p.m. The catalysts were dried and then calcined for 24 hours in air at 600° C. The catalysts were tested in the same manner as Example 73 and the results are shown in Table IX below.

Referring to Table IX below, it can be seen that the addition of only 200 p.p.m. of copper increases the conversion six-fold with little loss in selectivity (compare Examples 73 and 74) while the addition of 1000 p.p.m. of copper results in the same increase in conversion but the selectivity is reduced (Example 75).

TABLE IX.—HYDROLYSIS OF 2-CHLORO-PARA-XYLENE

[Conditions.—400° C.; 0.296 volume of xylene per volume of catalyst per hour; a molar ratio of water to xylene of 1; atmospheric pressure for 2 hours.]

| Ex. No. | Rare earth metal phosphate | P.p.m. of copper | Conversion, wt. percent | Selectivity, wt. percent | Yield, wt. percent |
|---|---|---|---|---|---|
| 73 | LaPO$_4$ | 0 | 2.6 | 100 | 2.6 |
| 74 | LaPO$_4$ | 200 | 18.3 | 95 | 17.4 |
| 75 | LaPO$_4$ | 1,000 | 20.2 | 54 | 10.9 |

Example 76

The catalyst for this example was prepared the same as the catalyst for Example 72 except 2000 cc's of distilled water was used in the mixing vessel initially and the rate of addition of solution (1) and solution (2) after the pH of 3.0 was attained was 500 cc./min. and 250 cc./min. respectively.

Example 77

Example 71 was repeated except the catalyst of Example 76 was used and the reaction temperature was 425° C. The conversion of 2-chloro-para-xylene was 9.8 weight percent and the selectivity to the formation of 2,5-dimethylphenol was 98.0 weight percent, for a yield of 9.6 weight percent. The results are shown in Table X below.

Example 78

The catalyst of Example 76 was impregnated by the method of incipient wetness using an aqueous solution of copper nitrate to deposit on the catalyst a nominal amount of copper amounting to 200 p.p.m. The catalyst was tested under the same conditions as Example 77. The conversion increased to 22.3 weight percent at the same selectivity for a yield of 21.8 weight percent. The results are shown in Table XI below.

TABLE X.—HYDROLYSIS OF 2-CHLORO-PARA-XYLENE

[Conditions.—425° C.; 0.296 volume of xylene per volume of catalyst per hour; a molar ratio of water to xylene of 1; atmospheric pressure for 2 hours]

| Ex. No. | Rare earth metal phosphate | P.p.m. of copper | Conversion, wt. percent | Selectivity, wt. percent | Yield, wt. percent |
|---|---|---|---|---|---|
| 77 | LaPO₄ | 0 | 9.8 | 98 | 9.6 |
| 78 | LaPO₄ | 200 | 22.3 | 98 | 21.8 |

Example 79

The catalyst of this example was prepared in the same manner as the catalyst for Example 76 except 0.05 gram of ferric nitrate $(Fe(NO_3)_3 \cdot 9H_2O)$ in aqueous solution was added to the lanthanum nitrate solution.

Example 80

Example 77 was repeated except using the catalyst of Example 79. In addition, the reaction time was only one hour. The conversion of 2-chloro-para-xylene was 8.6 weight percent. The selectivity to the formation of 2,5-dimethylphenol was 98.6 weight percent, for a yield of 8.5 weight percent.

Example 81

The catalyst of Example 80 was regenerated by heating at 460° C. for 1.5 hours in a flow of air. After the catalyst cooled, it was impregnated with an aqueous solution of copper nitrate by the method of incipient wetness to produce a catalyst containing a nominal amount of copper in the amount of 200 p.p.m. The catalyst was dried at 250° C. and calcined in air at 600° C. for one hour. This catalyst was run in the same manner as Example 80. The conversion of 2-chloro-para-xylene was 36.2 weight percent. The selectivity to the formation of 2,5-dimethylphenol was 96.3, for a yield of 34.9 weight percent.

A series of copper promoted catalysts were prepared by coprecipitating the copper and rare earth metal together from an aqueous solution of their nitrate salts using the technique of Example 79, except copper nitrate was used in place of ferric nitrate and the calcination temperature was in some cases 600° C. Sufficient copper nitrate was used to give the nominal amounts shown in Table XI below. Each of these catalysts was tested for the hydrolysis of 2-chloro-para-xylene using the same conditions as Example 73. The results are shown in Table XI below.

Example 91

Example 85 was repeated except meta-dichlorobenzene was used as the charge stock. The conversion of meta-dichlorobenzene was 13.6 weight percent; the selectivity to the formation of phenol and 2-chlorophenol was 73.9 weight percent, for a yield of 10 weight percent. The product predominated in phenol.

Example 92

Example 85 was repeated except the reaction temperature was reduced to 300° C. The conversion was reduced to three weight percent and the selectivity was 100 percent.

The catalyst of Example 85 was also employed for the hydrolysis of bromobenzene and for the hydrolysis of iodobenzene and lower conversions were realized. The chloroaromatics are thus the most preferred charge stocks for the process of this invention. A copper promoted lanthanum phosphate catalyst was also employed for the hydrolysis of 1,2,4-trichlorobenzene and 3,4-dichlorotoluene. The di and trichloro derivatives tended to form the monohydroxy products with the second and third chloro substituents being replaced with hydrogen, especially at the higher temperatures. Apparently the first chloro group hydrolyzed slowly and any additional halogen groups are then more quickly replaced with hydrogen.

In one further aspect of this invention, it has been found that the presence of cerium in the rare earth metal catalysts appears to result in a faster rate of burnoff of coke during regeneration.

Resort may be had to such variations and modifications as fall within the spirit of the invention and the scope of the appended claims.

We claim:

1. A method for the preparation of a rare earth metal phosphate wherein the rare earth metal is principally selected from the group consisting of lanthanum, cerium and neodymium which comprises
    forming a first aqueous solution of a rare earth metal nitrate and adjusting the pH of the aqueous solution to about 4.5 to 5.0 by the addition of $HNO_3$;
    forming a second aqueous solution by the addition of $NH_3$ to a dilute aqueous solution of $H_3PO_4$ until the pH reaches a level of about 8.0 to 9.0;
    contacting said first and second aqueous solutions in relative amounts such that the molar ratio of rare earth metal to the phosphate ion is from 1:1 to 1:3 to precipitate the desired rare earth metal phosphate in a pH range for the combined solutions of from 1.0 to 5.5 and continuing the addition of said second aqueous solution until the pH of the added solution increases to a level of 6.0 to 6.5.

2. A method according to claim 1 wherein the pH of the first aqueous solution is adjusted to about 4.7 and the pH of the second aqueous solution is initially adjusted to about 8.7.

3. A method according to claim 2 wherein the rare earth metal is lanthanum.

4. A method for the preparation of a rare earth metal phosphate wherein the rare earth metal is principally

TABLE XI.—HYDROLYSIS OF 2-CHLORO-PARA-XLYENE

[Conditions.—400° C.; 0.296 volume of xylene per volume of catalyst per hour; a molar ratio of water to xylene of 1; atmospheric pressure for 2 hours.]

| Example number | Rare earth metal phosphate | Copper, p.p.m. | Conversion, wt. percent | Selectivity, wt. percent | Yield, wt. percent | Calcination temp., °C. |
|---|---|---|---|---|---|---|
| 82 | LaPO₄ | 120 | 19.6 | 99.7 | 19.5 | 500 |
| 83 | LaPO₄ | 240 | 26.9 | 99.1 | 26.6 | 500 |
| 84 | LaPO₄ | 260 | 25.1 | 97.9 | 24.6 | 600 |
| 85 | LaPO₄ | 480 | 34.3 | 98.8 | 33.9 | 600 |
| 86 | LaPO₄ | 750 | 33.0 | 98.3 | 32.4 | 500 |
| 87 | LaPO₄ | 1,000 | 37.4 | 95.7 | 35.8 | 600 |
| 88 | La₀.₉₅Ce₀.₀₅PO₄ | 0 | 7.8 | 100.0 | 7.8 | 600 |
| 89 | La₀.₉₅Ce₀.₀₅PO₄ | 480 | 25.2 | 99.0 | 24.9 | 600 |
| 90 | (ᵃ) | 480 | 29.6 | 98.7 | 29.2 | 600 |

ᵃ Mixed rare earths. The mixture was the same as that defined and used in Example 23.

selected from the group consisting of lanthanum, cerium and neodymium which comprises:

forming a first aqueous solution of a rare earth metal salt and adjusting the pH to a level of about 4.5 to 5.0;

forming a second aqueous solution of a phosphate ion by the addition of $NH_3$ to a dilute aqueous solution of $H_3PO_4$ until the pH is from 7.5 to 9.5;

adding said second aqueous solution to said first aqueous solution at a slow rate with intimate admixing in relative amounts such that the molar ratio of rare earth metal to the phosphate ion is from 1:1 to 1:3 to precipitate the rare earth metal phosphate while maintaining the pH of the combined solutions at a constant value within the range of 2.5 to 4.0 and continuing said addition of said second aqueous solution until the pH of the combined solutions is from 5.5 to 8.0;

separating said precipitated rare earth metal phosphate from said combined solutions.

5. A method for the preparation of a rare earth metal phosphate wherein the rare earth metal is principally selected from the group consisting of lanthanum, cerium and neodymium which comprises:

forming a first aqueous solution of a rare earth metal salt and adjusting the pH of the aqueous solution to about 4.5 to 5.0;

forming a second aqueous solution by the addition of $NH_3$ to a dilute aqueous solution of $H_3PO_4$ until the pH reaches a level of about 8.0 to 9.0;

continuously adding portions of said first and said second solutions to a precipitation zone in amounts such that the molar ratio of the rare earth metal to the phosphate ion is from 1:1 to 1:3 to precipitate said rare earth metal phosphate;

continuously monitoring the pH of the combined solutions;

when the pH of the combined solutions is in the range of 5.0 to 2.5, maintaining the pH at some desired constant pH within the range of 5.0 to 2.5 throughout the remainder of the addition step;

thereafter increasing the pH of the combined solutions to a level from 5.5 to 6.5;

and thereafter separating the precipitated rare earth metal phosphate.

6. A method according to claim 5 wherein the pH of the combined solutions is maintained at a constant value within the range of 5.0 to 2.5 by the addition of an alkaline material.

7. A method according to claim 6 wherein the alkaline material is selected from the group consisting of $NH_4OH$, NaOH and KOH.

8. A method according to claim 5 wherein the rare earth metal salt is a nitrate.

9. A method according to claim 5 wherein the rare earth metal salt is lanthanum nitrate.

10. A method according to claim 5 wherein the rare earth metal salt is a chloride.

11. A method according to claim 10 wherein the rare earth metal is lanthanum.

12. A method according to claim 5 wherein the rare earth metal is a mixture of rare earth metal nitrates.

13. A prcoess according to claim 5 wherein the rare earth metal is a commercially available mixture of lanthanides.

References Cited
UNITED STATES PATENTS

| | | | |
|---|---|---|---|
| 2,449,050 | 9/1948 | Bond et al. | 252—462 X |
| 3,544,452 | 12/1970 | Jaffe | 252—462 X |

OTHER REFERENCES

Buyers et al.: "Journal of Inorganic and Nuclear Chemistry," vol. 5, 1957, pp. 133–140.

Alberti et al.: "Journal of Inorganic and Nuclear Chemistry," vol. 30, 1968, pp. 295–304.

HERBERT T. CARTER, Primary Examiner

U.S. Cl. X.R.

252—462; 260—629; 423—305, 311

UNITED STATES PATENT OFFICE
CERTIFICATE OF CORRECTION

Patent No. 3,752,878                     Dated August 14, 1973

Inventor(s) William L. Kehl and Raymond J. Rennard, Jr.

It is certified that error appears in the above-identified patent and that said Letters Patent are hereby corrected as shown below:

Col. 17, Table XI, Ex. 89, "$La_{0.95}Ce_{0105}PO_4$"

should read -- $La_{0.95}Ce_{0.05}PO_4$ --.

Signed and sealed this 18th day of December 1973.

(SEAL)
Attest:

EDWARD M. FLETCHER, JR.
Attesting Officer

RENE D. TEGTMEYER
Acting Commissioner of Patents